UNITED STATES PATENT OFFICE 2,424,054

METHOD OF COATING METAL WITH INORGANIC INSULATING COMPOSITION

Edward Roach, Los Angeles, Calif., assignor to John U. Birnie, Los Angeles, Calif.

No Drawing. Application October 18, 1943, Serial No. 506,770

1 Claim. (Cl. 117—70)

This invention relates to insulating coatings for metallic surfaces and a method of applying the same.

Insulating coatings have been proposed for the surfaces of the steel plate construction of ships but none of them has all of the desired characteristics of a satisfactory thermal coefficient of expansion, adhering to the iron or steel at temperatures above 1200° F., being fireproof and waterproof, being a non-conductor of electricity and a thermal insulator as well, not corrodible or otherwise unfavorably affected by ocean spray, and not sweating under conditions of high humidity. For example, paint peels and burns at high temperatures and gives off acrid products of decomposition; and in the case of compositions containing cork, the cork, even if it does not burst into flame, smolders and gives off smoke and fumes that have made it impossible for firefighting, repair, and rescue squads to enter and remain within spaces where the cork has been smoldering or undergoing decomposition by heat.

It is the principal objects of this invention to provide coatings or coverings that avoid the disadvantages of prior coatings and have all of the desirable characteristics referred to above; to provide coatings that can be easily applied; to provide an effective method of applying such coatings; other objects will be apparent on reading this specification.

My coating composition comprises silica, an alkaline earth oxide, a fluoride, and waterglass. Calcined dolomite, which is a mixture of calcium oxide and magnesium oxide is preferred as the alkaline earth oxide, although another alkaline earth oxide or mixtures thereof may be used. Calcium fluoride is the preferred fluoride. The ingredients are thoroughly intermixed, and are preferably in finely divided form, the silica being preferably ground to a fineness of minus 200 mesh. The preferred proportions are, by weights, 1⅘ parts of silica, ⅛ part of calcined dolomite, and ⅛ part of calcium fluoride, or chemically equivalent proportions of equivalents. The proportions may be varied and still produce good results, but those given are preferred. The waterglass is preferably of sodium silicate solution of 38° Baumé.

The intermixture above referred to is combined with the sodium silicate, in the proportion of 2 parts by weight of the dry mixture of silica, calcined dolomite, and calcium fluoride, to one part of the sodium silicate solution, in the following manner which should be followed for the best results. The dry mixture is added slowly and cautiously to the sodium silicate solution with constant agitation or stirring, until the 2 parts of dry mixture and one part of sodium silicate solution have been thoroughly mixed. This results in a thick pasty mass. More of the sodium silicate solution is then added cautiously with constant agitation or stirring until the mass acquires the proper consistency for application by spraying under high pressure. This is applied to form the binder coat and upon which a mastic coat is superposed.

The paste for the mastic coat is prepared exactly in the same way as that for the binder coat, and asbestos, preferably of a grade known as 7B is added thereto in the proportion of one part by weight of the asbestos for each four parts of the dry mixture used in the binder composition. This proportion of asbestos corresponds to about ten percent by weight of the binder composition. Enough of the sodium silicate solution is then added to lend to the mass the same consistency as the binder composition so that it can be sprayed on under high pressure, the mass being agitated or stirred until air bubbles are all expelled therefrom. This completes the making of the mastic composition.

The application of the binders and mastic composition is as follows. The iron, steel or other metal surface is first cleaned if it is too dirty. The binder composition is sprayed thereonto and allowed to stand until pressure with the finger makes only a slight indentation. This requires about one hour. The mastic composition is then sprayed onto this partially set binder coat until the mastic coat is of the desired thickness. It is then allowed to stand for about seventy-two hours to cure. The coating is then given an acid treatment, preferably by spraying a weak solution of acid thereon. Any inorganic or organic acid may be used, provided it is not too weakly acid. Hydrochloric acid is preferred because it is a strong acid and any excess will evaporate. A solution made by diluting one part by volume of a strong solution of hydrochloric acid as purchased on the market with ten parts by volume of water is preferred. After standing for about twenty-four hours the coating is completed.

The completed coating is fireproof in that it does not burn, burst into flame, smolder, nor give off objectionable fumes at temperatures up to and above 1200° F.; it adheres to iron or other metal after being held for one hour at a temperature above 1200° F.; its adhesion to iron or steel amounts to 110 pounds per square inch;

it has a suitable thermal co-efficient of expansion as is indicated by such adhesion; it is not affected by ocean spray nor high humidity nor does it sweat; its electrical conductivity is nil; it has high heat insulating qualities; it does not absorb water easily since on soaking in water for one hour it absorbs only seven percent of its own weight, and it is neutral since its pH is 7.4 which corresponds to the hydrogen iron concentration of neutrality.

Certain details have been referred to for the purpose of describing the invention and may be varied without departing from its spirit.

Having thus described my invention, what I claim and desire to secure by Letters Patent is:

The process of forming on a ferrous metal a fireproof, waterproof, non-sweating, insulating, adherent coating having a neutral surface, which comprises slowly adding, with constant stirring, a mixture of about 1.8 lbs. of silica, about 0.125 lb. of calcined dolomite, and about 0.125 lb. of calcium fluoride, said components in finely divided form and said silica having a fineness of minus 200 mesh, to about 1.015 lbs. of sodium silicate solution of about 38° Bé. to form a thick paste, adding more of said solution thereto slowly with constant stirring until the paste has the proper consistency for spraying, spraying the resulting mass onto a ferrous metal, making a paste similarly to that above referred to, adding thereto an amount of asbestos equal to about 10 percent of the weight of said paste, adding more of said solution thereto with constant stirring until the paste has again assumed the aforesaid consistency, spraying the resulting mass onto said first mentioned coating after said coating has stood for about one hour, allowing both coatings to stand for about seventy-two hours, spraying the outer surface of the applied coating with diluted hydrochloric acid, and allowing the coating to stand for about twenty-four hours.

EDWARD ROACH.

REFERENCES CITED

The following references are of record in the file of this patent:

UNITED STATES PATENTS

| Number | Name | Date |
| --- | --- | --- |
| 1,383,517 | Bezzenberger | July 5, 1921 |
| 1,107,360 | York | Feb. 13, 1912 |
| 1,513,191 | Smith | Oct. 28, 1924 |
| 63,087 | Pelletier | Mar. 19, 1867 |
| 209,770 | Meyer | Nov. 12, 1878 |
| 277,043 | Lumbye | May 8, 1883 |
| 449,214 | Enricht | Mar. 31, 1891 |
| 1,129,060 | Billwiller | Feb. 23, 1915 |
| 1,507,181 | Hopkins | Sept. 2, 1924 |
| 1,672,857 | Blake | June 5, 1928 |
| 1,761,343 | Holzapfel | June 3, 1930 |

FOREIGN PATENTS

| Number | Country | Date |
| --- | --- | --- |
| 186,231 | Great Britain | Sept. 28, 1922 |
| 36,966 | Germany | Aug. 31, 1886 |
| 377,109 | Germany | June 9, 1923 |
| 58,185 | Austria | Mar. 10, 1913 |